US010660277B2

(12) United States Patent
McCall et al.

(10) Patent No.: US 10,660,277 B2
(45) Date of Patent: May 26, 2020

(54) VINE GROWING MANAGEMENT METHOD AND APPARATUS WITH AUTONOMOUS VEHICLES

(71) Applicant: Pollen Systems Corporation, Bellevue, WA (US)

(72) Inventors: Keith McCall, Sammamish, WA (US); Carolyn Canterman, Seattle, WA (US); Trina Nelson, Issaquah, WA (US)

(73) Assignee: Pollen Systems Corporation, Bellevue, WA (US)

( * ) Notice: Subject to any disclaimer, the term of this patent is extended or adjusted under 35 U.S.C. 154(b) by 0 days.

(21) Appl. No.: 16/128,309

(22) Filed: Sep. 11, 2018

(65) Prior Publication Data
US 2020/0077601 A1    Mar. 12, 2020

(51) Int. Cl.
*A01G 17/02* (2006.01)
*B64C 39/02* (2006.01)
*G05D 1/10* (2006.01)
*G05D 1/00* (2006.01)
*H04N 5/247* (2006.01)
*G06T 7/00* (2017.01)

(52) U.S. Cl.
CPC ............ *A01G 17/02* (2013.01); *B64C 39/024* (2013.01); *G05D 1/0088* (2013.01); *G05D 1/0094* (2013.01); *G05D 1/101* (2013.01); *G06T 7/0012* (2013.01); *H04N 5/247* (2013.01); *B64C 2201/127* (2013.01); *B64C 2201/141* (2013.01); *G05D 2201/0201* (2013.01); *G06T 2207/10024* (2013.01); *G06T 2207/10036* (2013.01); *G06T 2207/10048* (2013.01); *G06T 2207/20221* (2013.01); *G06T 2207/30188* (2013.01)

(58) Field of Classification Search
CPC .............................. A01G 17/02; B64C 39/024
USPC ......................................................... 348/144
See application file for complete search history.

(56) References Cited

U.S. PATENT DOCUMENTS

| 2016/0050840 | A1* | 2/2016 | Sauder | A01B 79/005 701/3 |
| 2017/0374323 | A1* | 12/2017 | Gornik | G06T 7/0004 |
| 2018/0176488 | A1* | 6/2018 | Dvir | G02B 23/18 |
| 2019/0150357 | A1* | 5/2019 | Wu | A01C 21/007 |
| 2019/0230875 | A1* | 8/2019 | Mewes | A01G 25/167 |

* cited by examiner

Primary Examiner — Jeffery A Williams
(74) Attorney, Agent, or Firm — Schwabe, Williamson & Wyatt, P.C.

(57) ABSTRACT

In some embodiments, a method for managing growing vine in a vineyard includes operating one or more unmanned aerial vehicles (UAV) to fly over a plurality of sections of a vineyard. The UAVs are fitted with a plurality of cameras equipped to generate images in a plurality of spectrums. The plurality of sections of the vineyard grow vines of a plurality of varietals. The method further includes taking a plurality of aerial images of the sections of the vineyard in the plurality of spectrums, using the plurality of cameras, while the UAVs are flying over the plurality of sections of the vineyard, and executing an analyzer on a computing system to machine analyze the plurality of aerial images for anomalies associated with growing the vines of the plurality of varietals. The machine analysis takes into consideration topological information of the vineyard, as well as current planting information of the vineyard.

23 Claims, 13 Drawing Sheets

VINE GROWING MANAGEMENT METHOD AND APPARATUS WITH AUTONOMOUS VEHICLES

TECHNICAL FIELD

The present disclosure relates to the field of agriculture. More particularly, the present disclosure relates to method and apparatus for managing growing of vines of a plurality of varietals in a vineyard, with the assistance of autonomous vehicles.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Consumption of wine in America has steadily increased in the last two decades, growing from about 500 million gallons in the year 1996 to about 949 million gallons in 2016[1]. The value of the total U.S. Wine Market for the year 2017 is estimated to be $62.7 billion, of which, $41.8 billion are domestically produced[2]. Currently, for the year 2018, the number of wineries in U.S. is estimated to be about 9,654[3]. The total vine growing acres in the U.S. was estimated to exceed 1,000,000 acres, as far back as 2012[4]

[1] Source: Wine Institute, DOC, BW166/Gomberg, Fredrikson & Associates estimates. Preliminary History revised.
[2] Source: Wines & Vines, 2018, BW166, 2018.
[3] Source: Statisa—The Statistics Portal.
[4] The world's grape growing (vineyard) surface area 2000-2012 by Per Karlsson, Jun. 6, 2013, Winemaking & Viticulture.

Owning and operating a vineyard is a tough business. "To take on the challenge of running a winery, you need to be determined, fearless, and passionate about your craft—although owning a vineyard seems romantic, the winemaking business is a tough one."[5] In addition to the upfront financial investments required for the land and the infrastructure (like building, bottling and cellar equipment, trucks, and so forth), there are multitude of potential problems that could arise with growing vines. Examples of these problems may include, but are not limited to, over or under irrigation, diseases (such as mildews and black rots), or pests (such as berry moth, Japanese beetles, and rose chafers). Further, these problems may vary from one varietal to another. And a vineyard typically grows vines of multiple varietals.

[5] The Economics of Running a Winery, Aug. 20, 2018, Caroline Goldstein.

Additionally, it is not uncommon for a vineyard to span over 100 acres, with over 1000 vines planted per acre. And multiple varietals are planted in different sections of the vineyard. Thus, methods and apparatuses that can improve the management of growing vines of multiple varietals in a vineyard are desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
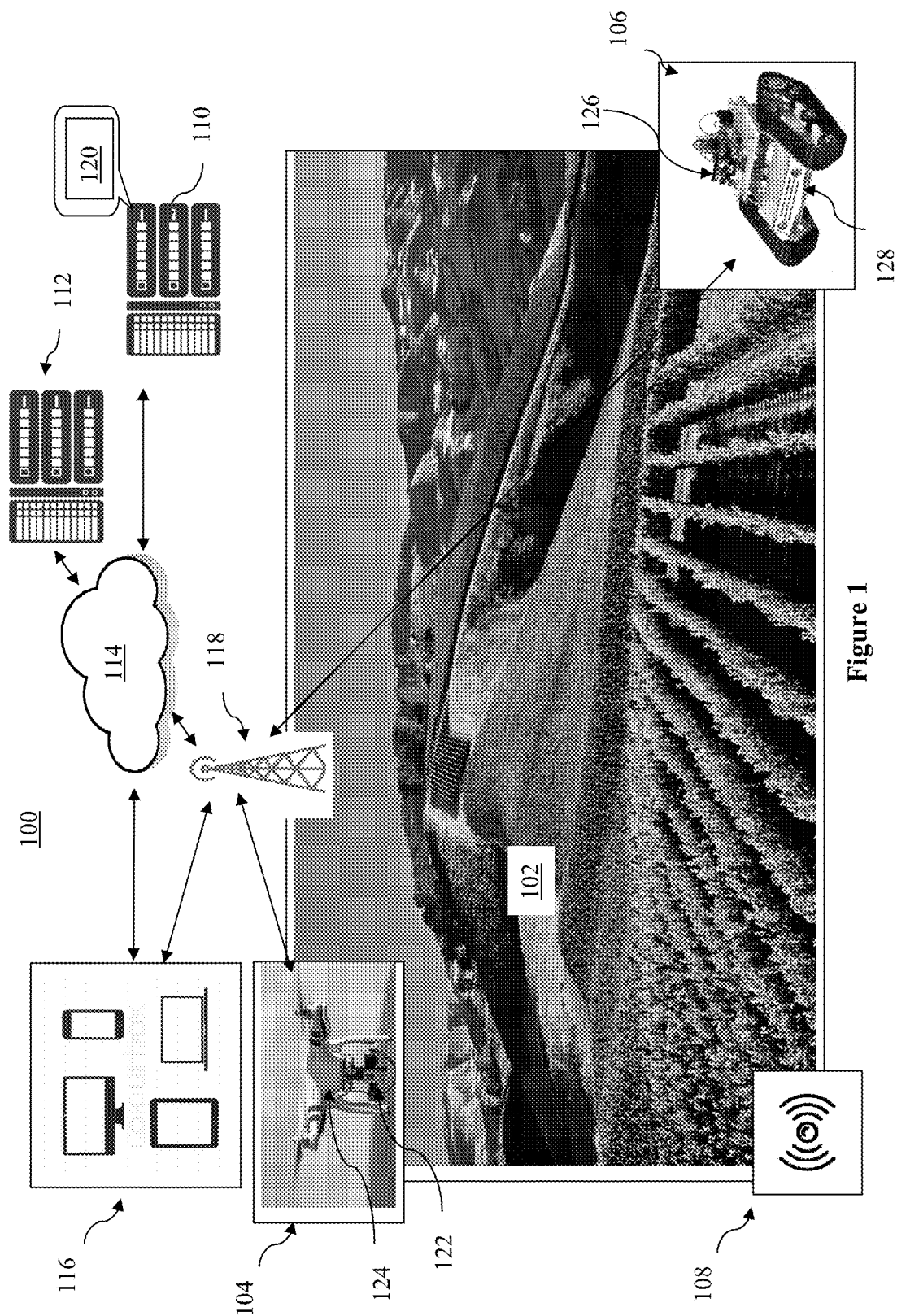
FIG. 1 illustrates an overview of a system for managing growing vine of the present disclosure, in accordance with various embodiments.

To address challenges discussed in the background section, apparatuses, methods and storage medium associated with managing growing vines in a vineyard, are disclosed herein. In some embodiments, a method for managing growing vine in a vineyard includes operating one or more unmanned aerial vehicles (UAV) to fly over a plurality of sections of a vineyard. The UAVs are fitted with a plurality of cameras equipped to generate images in a plurality of spectrums. The plurality of sections of the vineyard may grow vines of a plurality of varietals. The method further includes taking a plurality of aerial images of the sections of the vineyard in the plurality of spectrums, using the plurality of cameras, while the UAVs are flying over the plurality of sections of the vineyard; storing the plurality of aerial images of a plurality of spectrums of the vines of the plurality of varietals being grown, in a computer readable storage medium (CRSM), and executing an analyzer on a computing system to machine analyze the plurality of aerial images for anomalies associated with growing the vines of the plurality of varietals. The machine analysis takes into consideration topological information of the vineyard, as well as current planting information of the vineyard.

In some embodiments, the method includes operating one or more terrestrial robots to traverse the plurality of sections of the vineyard. The one or more terrestrial robots are fitted with one or more cameras equipped to generate images in visual spectrum. The method further includes taking a plurality of visual spectrum terrestrial images of the vines of the plurality of varietals being grown in the plurality of sections of the vineyards, using the one or more cameras fitted on the one or more terrestrial robots, while the one or more terrestrial robots are traversing the plurality of sections of the vineyard; storing the plurality of visual spectrum terrestrial images of the vines of the plurality of varietals being grown, in the CRSM; and executing the analyzer on the computing system to machine analyze the plurality of visual spectrum terrestrial images for additional anomalies associated with growing the vines of the plurality of varietals in the plurality of sections of the vineyard. The machine analysis of the visual spectrum terrestrial images takes into consideration phenology information of the varietals being grown, at different growing stages.

These and are other aspects of the methods and apparatuses for managing growing vine in a vineyard will be further described with references to the Figures. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of a system for managing growing vine of the present disclosure, in accordance with various embodiments, is illustrated. As shown, system 100 for managing growing vines in a vineyard 102 may include one or more UAVs 104, and vine growing management system 110 having vine growing management software 120. In some embodiments, system 100 may further include one or more terrestrial robots 108. Collectively, one or more UAVs 104 are fitted with a plurality of cameras to capture aerial images in a plurality of spectrums. The UAVs 104 are operated to fly over vineyard 102 and capture aerial images of various sections of vineyard 102 in the plurality of spectrums. Different varietals may be grown in different sections of vineyard 102. Examples of varietals may include, but are not limited to, cabernet sauvignon, pinot noir, chardonnay, pinot gris, and so forth. The plurality of spectrums may include, but are not limited to, visual, red, near infrared, near red, and so forth.

Vine growing management software 120 is configured to be executed on one or more computer processors of vine growing management system 110, to machine process the aerial images taken, and machine analyze the aerial images for anomalies associated with growing vines of the varietal, e.g., over or under irrigation, and generate a visual report with indications of the anomalies. The machine analysis and reporting takes into consideration topological information of the vineyard, e.g., natural or man made geographical features, like a pond, a building and so forth, current planting information, e.g., the varietals being grown, and where in vineyard 102.

For embodiments where system 100 also includes one or more terrestrial robots 106, each of the one or more terrestrial robots 106 is equipped with one or more cameras to capture terrestrial images in visual spectrum, in one or more directions. The one or more directions may include a left (up/straight ahead/down) outward looking direction, a right (up/straight ahead/down) outward looking direction, a forward (up/straight ahead/down) outward looking direction, and/or a backward (up/straight ahead/down) outward looking direction. The one or more terrestrial robots 106 are operated to traverse vineyard 102 and capture terrestrial images of the vines of various varietals being grown in the various sections of vineyard 102, in the visual spectrum. The images of the vines may show various aspects of the vines, e.g., its grapes, its leaves, its roots, and so forth.

Vine growing management software 120 is further configured to be executed on the one or more computer processors of vine growing management system 110, to machine process the terrestrial images taken, and machine analyze the terrestrial images of the vines for further anomalies associated with growing vines of the varietal, e.g., plant diseases and/or pest infestations, and generate a visual report with indications of the anomalies. The machine analysis and reporting additional takes into consideration phenology information of the varietals, at different growing stages.

In some embodiments, a plurality of UAVs 104 are employed. Each UAV 104 is either successively or concurrently fitted with three (3) cameras for capturing aerial images in 3 spectrums, visual spectrum, red or near infrared spectrum, and near red spectrum. In some embodiments, the 3 cameras include a red/green/blue (RGB) camera configured to capture and generate images in visual spectrum, a Normalized Difference Vegetation Index (NDVI) camera configured to capture and generate images in red or near infrared spectrum, and a Normalized Difference Red Edge (NDRE) camera equipped to capture and generate images in near red spectrum. In some embodiments, one or more UAVs 104 may be fitted with one or more infrared thermal cameras to capture aerial thermal images of the various sections of vineyard 102. The plurality of UAVs 104 are operated to systematically fly over all sections of vineyard 102, or selectively fly over selected sections of vineyard 102, capturing and generating aerial images of the all or selected sections of vineyard 102. In some embodiments, the cameras has resolution and zoom in power to allow each pixel of each aerial image to cover approximately 3-4 cm$^2$ of a sectional area, with the UAVs 104 operated at 400 ft or below. In alternate embodiments, as camera resolution further improves, each pixel of each aerial image may cover an area as small as 1 cm$^2$.

In some embodiments, a plurality of terrestrial robots 106 are employed. Each terrestrial robot 106 is fitted with at least two (2) cameras to capture and generate terrestrial images of the vines of different varietals, in visual spectrum, in at least 2 directions along the routes traversed by the terrestrial robots 106. Similarly, the plurality of terrestrial robots 106 are operated to systematically traverse the entire vineyard 102 or selectively traverse selected sections of vineyard 102, capturing and generating terrestrial images of all vines of all varietals or selected vines of selected varietals grown in all or selected sections of vineyard 102.

In some embodiments, each UAV 104/robot 106 includes computer readable storage medium (CRSM) 124/126 to temporarily store the aerial/terrestrial images captured/generated. In some embodiments, the CRSM are removable, such as a universal serial bus (USB) drive, allowing the captured/generated aerial/terrestrial images to be removably transferred to CRSM of vine growing management system 110, via a compatible input/output (I/O) port on vine growing management system 110. In some embodiments, each UAV 104/robot 106 may include an I/O port (not shown), e.g., a USB port, to allow the stored aerial/terrestrial images to be accessed and transferred to vine growing management system 110. In still other embodiments, each UAV 104/robot 106 may include a communication interface, e.g., WiFi or Cellular interface, to allow the stored aerial/terrestrial images to be wirelessly transferred to vine growing management system 110, via e.g., access point/base station 118. Access point/base station 118 may be communicatively coupled with vine growing management system 110 via one or more private or public networks 114, including e.g., the Internet.

Except for the cameras fitted to UAVs 104, and the manner UAVs 104 and robots 106 are employed, UAVs 104 and robots 106 may otherwise be any one of a number of devices known in the art. For example, except for the cameras fitted to UAVs 104, UAVs 104 may be a tricopter, a qudcopter or a hexcopter. Similarly, terrestrial robots 106 may be wheeled, threaded or screw propelled.

Still referring to FIG. 1, in some embodiments, system 100 may further include various sensors 108 dispositioned at various locations in vineyard 108 to collect and generate various local environmental data. Example of sensors 108 may include, but are not limited to, temperature sensors for sensing local temperature, humidity sensors for sensing local humidity level, moisture sensors for sensing moisture level in the soil, and so forth. In various embodiments, sensors 108 may be equipped to provide the collected sensor data to vine growing management system 110 wirelessly, via access points/base station 118. In some embodiments, some of these sensors may be dispositioned in UAVs 104 and/or terrestrial robots 106 to collect and generate various local environmental data as UAVs 104 and/or terrestrial robots 106 fly over or traverse vineyard 102. For these embodiments where sensors 108 are employed, vine growing management software 120 further takes these local environmental data into consideration, when machine processing aerial images (and optionally, terrestrial images) to machine detect anomalies associated with growing vine of various varietals.

In some embodiments, system 100 may further include remote servers 112 having repositories of environmental data applicable to vineyard 102, e.g., weather or environmental data services, with temperature, precipitation, air pollution data for the geographical region/area where vineyard 102 is located. Vine growing management system 110 may be communicatively coupled with remote servers 112 via one or more private or public networks 114, including e.g., the Internet. For these embodiments, vine growing management software 120 further takes these regional environmental data into consideration, when machine processing and analyzing aerial images (and optionally, terrestrial images) to machine detect anomalies associated with growing vine of various varietals.

In some embodiments, vine growing management software 120 is further configured to support interactive viewing of the visual report by a user, via a user computing device 116. User computing device 116 may be coupled with vine growing management system 110 via one or more public and/or private networks 114, and/or access point/base station 118. In some embodiments, vine growing management software 120 may facilitate interactive viewing of the visual report, via web services. For these embodiments, user computing device 116 may access and interact with the visual report via a browser on user computing device 116. In some embodiments, vine growing management software 120 may provide an agent e.g., an app, to be installed on user computing device 116 to access and interact with the visual report. Except for its use to access and interact with the visual report, user computing device 116 may be any one of a number of computing devices known in the art. Examples of such computing devices may include, but are not limited to, desktop computers, mobile phones, laptop computers, computing tablets, and so forth.

Similarly, except for their use to facilitate provision of aerial/terrestrial images and/or environment data, as well as accessing the visual reports, access point/base stations 118 and network(s) 114 may be any one of a number access points/base stations and/or networks known in the art. Networks 114 may include one or more private and/or public networks, such as the Internet, local area or wide area, having any number of gateways, routers, switches, and so forth.

Before further describing elements of system 100, it should be noted while for ease of understanding, UAVs 104, terrestrial robots 106, and vineyard management system 110 have been described so far, and will continue to be mainly described as assisting in management of growing vine of a plurality of varietals in a vineyard, the present disclosure is not so limited. System 100 may be practiced with UAVs 104, terrestrial robots 106, and vineyard management system 110 configured to service multiple vineyards.

Figure 2A:
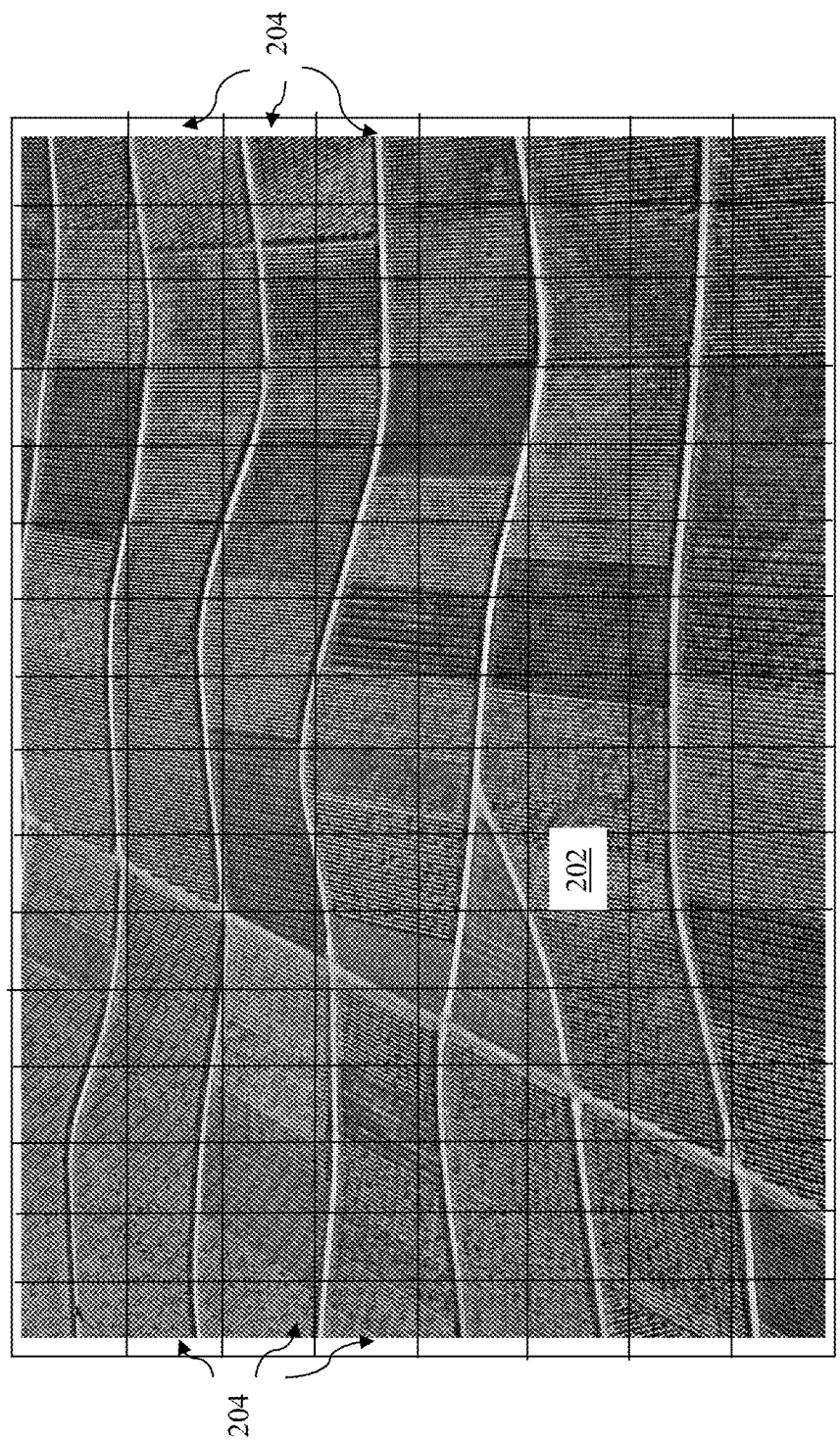
FIGS. 2A-2C illustrate taking of aerial images of a vineyard and terrestrial images of vines growing in the vineyard with the assistance of autonomous vehicles, according to various embodiments.
Figure 2B:
Figure 2C:

Referring now to FIGS. 2A-2C, wherein taking of aerial images of a vineyard and terrestrial images of vines growing in the vineyard with the assistance of autonomous vehicles, according to various embodiments, are illustrated. Shown in FIG. 2A is a composite aerial image 202 of vineyard 102, generated by combining or stitching together individual aerial images 204 taken by UAVs 104, while UAVs 104 fly over the vineyard. As described earlier, in some embodiments, the UAVs 104 are operated to systematically fly over all sections of vineyard 102 at a selected altitude. Each pixel of each aerial image covers an area of approximately 3-4 cm$^2$ or smaller. Thus, the number of aerial images 204 shown in FIG. 2A as being combined together to cover vineyard 102 are significantly less than the number of aerial images 204 combined/stitched together in real life. The number is reduced for ease of illustration and understanding, and thus is not to be read as limiting on the present disclosure.

The different levels of grayness in FIG. 2A correspond to different colors in real life in the composite NDVI or NDRE images combined/stitched together based on the individual NDVI/NDRE images taken, which in turn correspond to different conditions of the soil and/or different conditions of the vines (depending in part, on the varietals being grown).

Shown in FIGS. 2B-2C are example terrestrial images 220 and 230 of couple of the vines of couple varietals being grown in couple of the sections in vineyard 102, captured by the camera(s) of terrestrial robot(s) 106, while terrestrial robot(s) 106 is (are) operated to traverse various sections of vineyard 102. As illustrated by the example picture 220 in FIG. 2B, disease (in this case, downy mildew), may be machine detected, using the phenology information provide, for various growing stages of the varietal. As illustrated by the example picture 230 in FIG. 2C, infestation (in this case, sweetpotato weevil), may be machine detected, using the phenology information provide, for various growing stages of the varietal. FIGS. 2A and 2B are non-limiting examples. As those skilled in the vine growing art would appreciate, there are many possible vine diseases and/or infestations that need to be managed.

Figure 3:
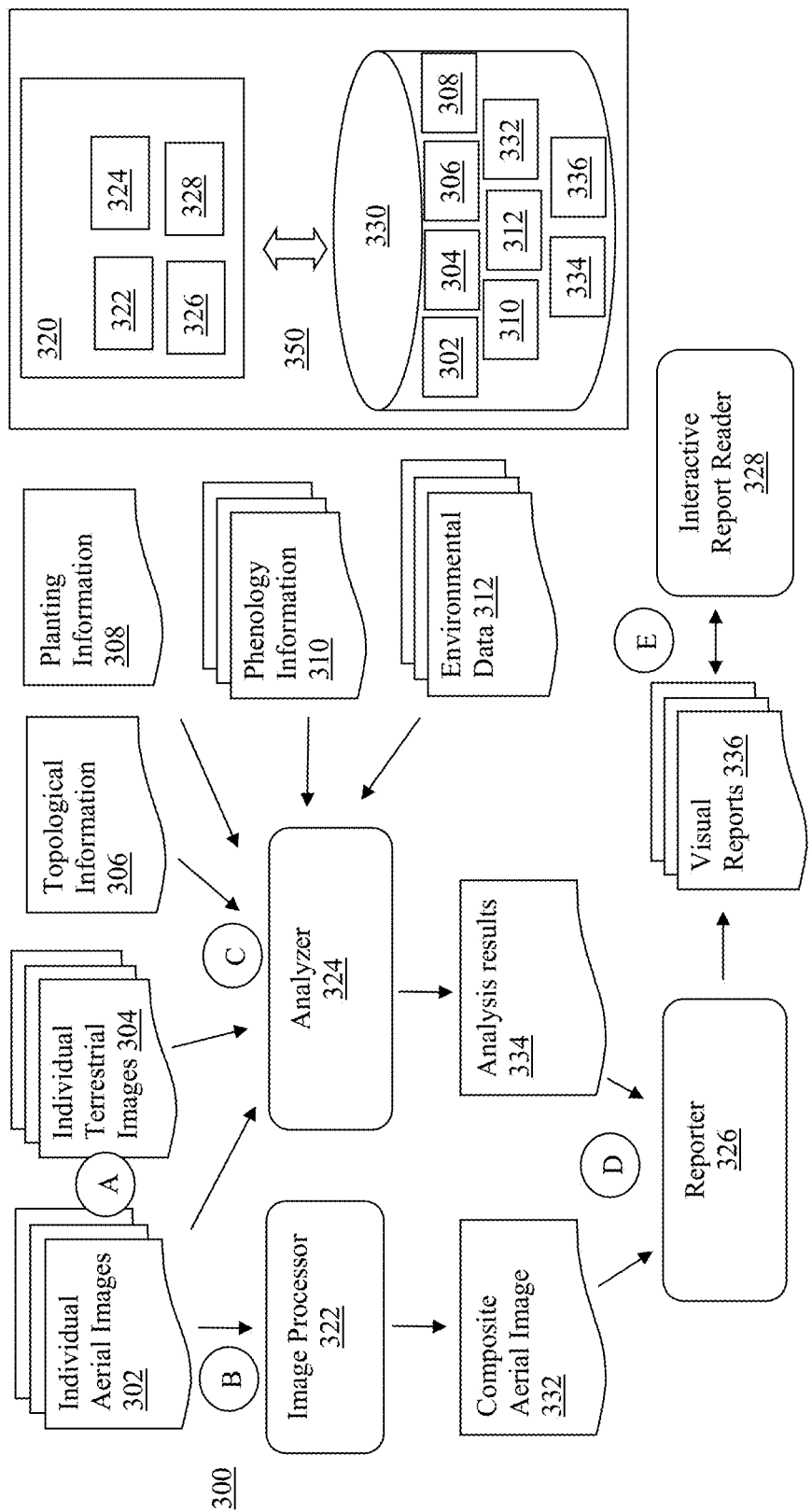
FIG. 3 illustrates a process for managing growing vine with the assistance of autonomous vehicles, and components of the vine growing management system of FIG. 1, according to various embodiments.

Referring now to FIG. 3, wherein an example process for managing growing vine with the assistance of autonomous vehicles, and components of an example vine growing management system of FIG. 1, according to various embodiments, are illustrated. As shown, for the illustrated embodiments, example vine growing management system 350 includes vine growing management software 320 and CRSM 320. Vine growing management system 350 may correspond to vine growing management system 110 of FIG. 1, and vine growing management software 320 may correspond to vine growing management software of 120 of FIG. 1.

Vine growing management software 320 includes image processor 322, analyzer 324, reporter 326 and interactive report reader 328. Image processor 322 is configured to process and combine/stitch together individual aerial images taken in various spectrums to form a plurality of composite aerial images 332 of the vineyard, in the various spectrums. Analyzer 324 is configured to machine process and analyze aerial images 302 and/or terrestrial images 304 to identify anomalies with growing vine of the various varietals in the various sections of the vineyard. In some embodiments, analyzer 324 is configured to apply artificial intelligence, e.g., neural networks, to identify anomalies with growing vine of the various varietals in the various sections of the vineyard. Reporter 326 is configured to machine generate one or more visual reports 336 of the vineyard, identifying/highlighting the anomalies associated with growing vine detected. In some embodiments, visual reports 336 may be two dimensional (2D) reports. In other embodiments, visual reports 336 may be three dimensional (3D) reports or halograms. Interactive report reader 328 is configured to facilitate a user in interactively viewing the visual report.

CRSM 330 is configured to store individual aerial images 302 of various sections of the vineyard, captured in various spectrums, as well as individual terrestrial images 304 of various vines of various varietal, captured in the visual spectrum. CRSM 330 is also configured to store topological information 306 of the vineyard, such as pond, creeks, streams and so forth, as well as current planting information 308, i.e. varietals planted, and where. CRSM 330 may also be configured to store phenology information 310 of the varietals, at different growing stages, and environmental data 312 collected by local sensors and/or received from remote servers. CRSM 330 may also be configured to store composite aerial images 332 generated from individual aerial images 302, analysis results 334 and reports 336.

In various embodiments, except for their usage CSRM 330 may be any one of CRSM known in the art including, but are not limited to, non-volatile or persistent memory, magnetic or solid state disk drives, compact-disk read-only memory (CD-ROM), magnetic tape drives, and so forth.

Still referring to FIG. 3, process 300 for managing growing of vines include operations performed at stages A-E. Starting at stage A, the UAVs fitted with a plurality of cameras equipped to capture/generate aerial images 302 in a plurality of spectrums are operated, in succession or concurrently, to fly over all or selected sections of the vineyard. And individual aerial images 302 of the various sections of the vineyard are taken as the UAVs fly over the sections at a selected altitude. As described, in some embodiments, the aerial images are taken at high resolution covering a small area of 3-4 cm$^2$ per pixel or smaller. On capture/generation, individual aerial images 302 of the various sections of the vineyard are stored into CRSM 330.

At stage A, the one or more terrestrial robots fitted with one or more cameras equipped to capture/generate terrestrial images 304 in visual spectrum may also be optionally operated, in succession or concurrently, to traverse all or selected sections of the vineyard. And individual terrestrial images 304 of various vines of various varietals being grown in the various sections of the vineyard are taken as the terrestrial robots traverse over the sections. On capture/generation, individual terrestrial images 304 of various vines of various varietals being grown in the various sections of the vineyard are stored into CRSM 330.

From stage A, process 300 may proceed to stages B and C in parallel. At stage B, image processor 322 may be executed on a computer system to machine process and combine/stitch together individual aerial images taken in various spectrums to form a plurality of composite aerial images 332 of the vineyard, in the various spectrums. On generation, composite aerial images 332 of the vineyard, in the various spectrums, are stored into CRSM 330.

At stage C, analyzer 324 may be executed on the computer system to machine process individual aerial images 302 and/or individual terrestrial images 304 to machine analyze and detect anomalies associated with growing vines of the various varietals, taking into consideration topological information of the vineyard, and current planting information of the vineyard. Anomalies may include, but are not limited, whether a section is under irrigated or over irrigated. By taking into consideration of the topological information, the analyzer may avoid false identification e.g., a pond or a creek as over irrigated, or a section growing vines of a varietal being stressed as under irrigated. In embodiments where terrestrial images 304 are also being machine processed and analyzed to detect anomalies associated with growing vines of the various varietals, the analysis may take into consideration phenology information of vines, at different growing stages. Anomalies may include, but are not limited, various types of plant diseases and/or pest infestations.

In some embodiments, machine analysis of aerial images 302 as well as terrestrial images 304, to detect anomalies associated with growing vines of the varietals may further take into consideration local environmental data 312 collected by local sensors disposed at various locations throughout the vineyard, and/or regional/areal environmental data 312 provided by one or more remote environmental data services, applicable to the vineyard.

From stages B and C, process 300 may proceed to stage D. At stage D, reporter 326 may be executed on a computer system to machine generate one or more visual reports 336 of the vineyard, with indications of the anomalies detected. The visual reports 336 are generated using composite aerial images 332, and based at least in part on the results of the analysis 334. As described earlier, visual reports 336 may be 2D, 3D or hologram.

Next, at stage E, on generation of visual reports 336, interactive report reader 328 may be executed on a computing system to machine facilitate interactive viewing of visual reports 336, by a user.

Still referring back to FIG. 3, in some embodiments, each of image processor 322, analyzer 324, reporter 326 and interactive report reader 328 may be implemented in hardware, software or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where analyzer includes at least one neural network, at least a portion of analyzer 324 may be implemented in an accelerator. One example software architecture and an example hardware computing platform will be further described later with references to FIGS. 10 and 11.

Figure 4A:
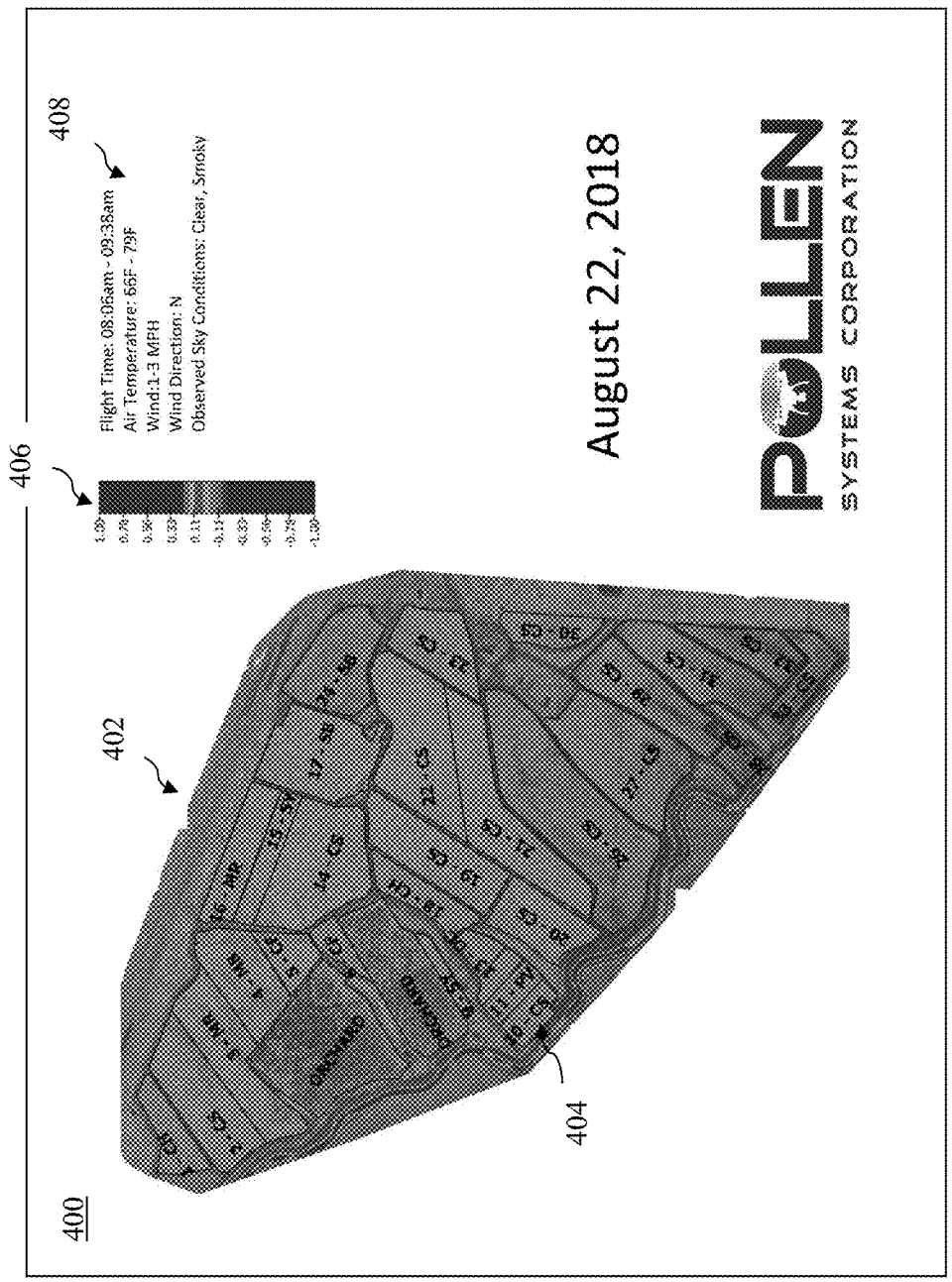
FIGS. 4A-4b illustrate an example visual report to assist in managing growing vines of a number of varietals, and an example user interface for interactively viewing the visual report, according to various embodiments.
Figure 4B:
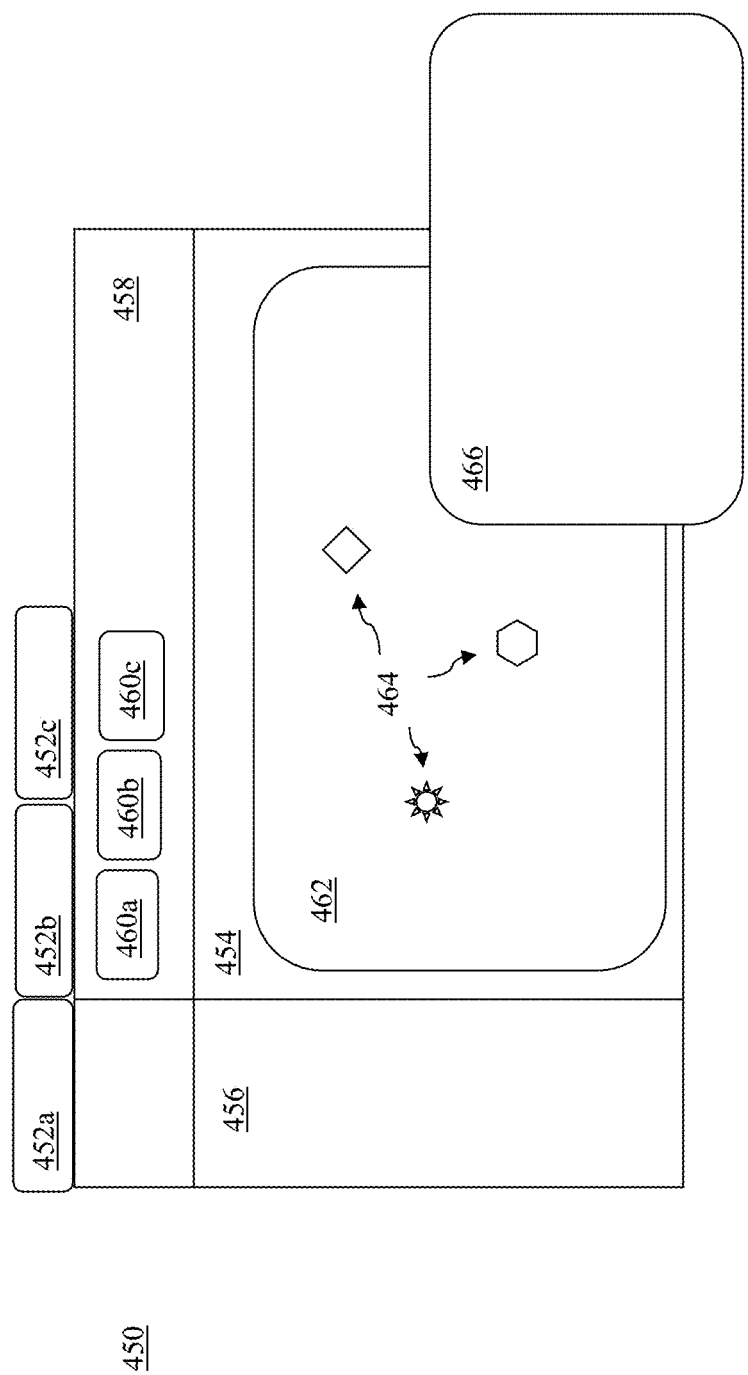

Referring now to FIGS. 4A-4*b*, wherein an example visual report to assist in managing vine growing, and an example user interface for interactively viewing the visual report, according to various embodiments, are illustrated. As shown in FIG. 4A and described earlier, example visual report 400 includes a composite image 402 of the vineyard, formed by combining or stitching together the individual aerial images taken of the various sections of the vineyard, while the UAVs flew over the sections of the vineyard. For the illustrated embodiments, the various sections of the vineyard may be annotated with various information 404 useful to the user, including but are not limited to, section identification information, varietal being grown, anomalies detected, and so forth. Example composite image 402 of the vineyard, is formed by combining or stitching together the individual aerial NDRE images taken of the various sections of the vineyard.

In various embodiments, visual report 400 is in colors. The different gray scale levels in the drawing correspond to different colors depicting various conditions as captured by the aerial images taken in a particular spectrum, e.g., NDVI, NDRE and so forth.

For the illustrated embodiments, visual report 400 may further include various legend 406 and auxiliary information 408 to assist a user in comprehending the information provided. For example, legend 406 may provide the quantitative scale of a condition metric, such as soil moisture level, corresponding to the different colors. Example auxiliary information 408 may include, but are not limited to, time the aerial images are taken, air temperature at the time, wind speed at the time, wind direction at the time, and other observed conditions at the time.

FIG. 4B illustrates an example user interface for facilitating a user in interactively viewing the visual reports with a user/client computing device. As shown, for the embodiments, user interface 450 includes a number of tabs 452*a*-452*c*, one each for viewing a particular visual report of aerial images taken in a particular spectrum. Each tab, e.g., tab 452*a*, includes main display area 454 for displaying the visual report 462 annotated with highlights 464 of anomalies detected. Additional, each tab may further include section 456 for displaying various information, e.g., file information, and section 458 for displaying various command icons. In response to a selection of a command, or a selection of an anomaly highlighted, a pop up window 466 may be displayed to provide further information and/or facilitate further interaction.

Figures 5, 6:
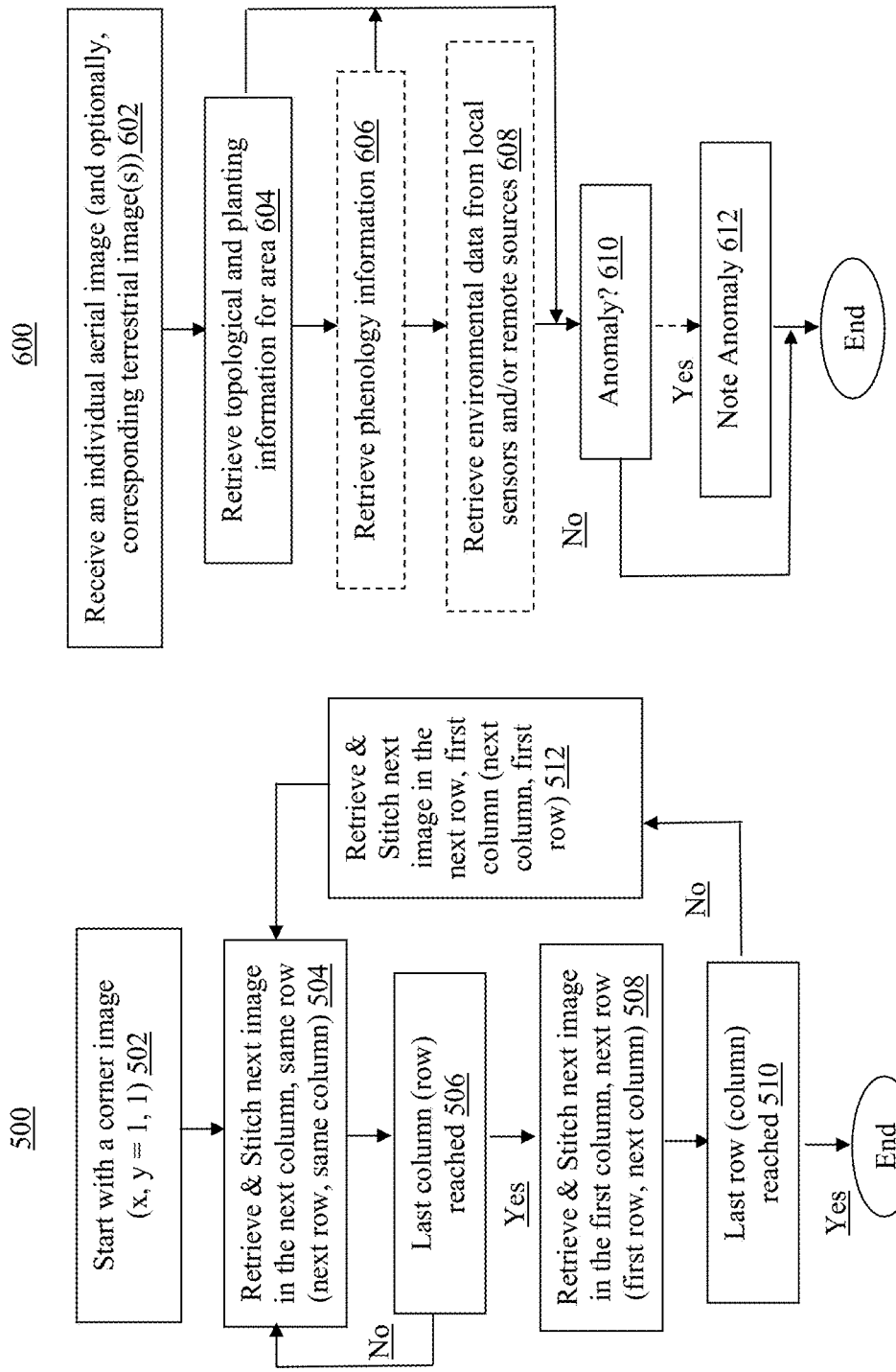
FIG. 5 illustrates an example process for machine processing the aerial images taken with the assistance of autonomous vehicles, according to various embodiments.
FIG. 6 illustrates an example process for machine analyzing the aerial and/or terrestrial images, according to various embodiments.

Referring now to FIG. 5, wherein an example process for machine processing the aerial images, according to various embodiments, is illustrated. As shown, for the embodiments, example process 500 for machine processing/combining the aerial images to generate the composite aerial image include operations perform at blocks 502-512. The operations may be performed by e.g., image processor 322 of FIG. 3.

Example process 500 starts at block 502. At block 502, a corner aerial image may be retrieved. For example, it may be the upper left corner image, the upper right corner image, the lower right corner image or the lower left corner image. Next at block 504, the next image in the next column of the same row (or next row, same column) may be retrieved and combined/stitched with the previously processed images, depending on whether the aerial images are being combined on a column first basis (or a row first basis).

At block 506, a determination is made if the last column has been reached, if the aerial images are being combed or stitched in a column first basis (or the last row has been reached, if the aerial images are being combed or stitched in a row first basis). If the last column of the row (or last row of the column) has not been reached, process 500 returns to block 504, and continues therefrom as earlier described. If the last column of the row (or last row of the column) has been reached, process 500 proceeds to block 508.

At block 508, the next image in the first column of the next row, if the aerial images are being combed or stitched in a column first basis (or first row, next column, if the aerial images are being combed or stitched in a row first basis) may be retrieved and combined/stitched with the previously processed images.

At block 510, a determination is made if the last row has been reached, if the aerial images are being combed or stitched in a column first basis (or the last column has been reached, if the aerial images are being combed or stitched in a row first basis). If the last row of the column (or last column of the row) has not been reached, process 500 proceeds to block 512.

At block 512, the next image in the next row, first column is retrieved, if the aerial images are being combed or stitched in a column first basis (or next column, first row, if the aerial images are being combed or stitched in a row first basis), and combined/stitched with the previously processed images. Thereafter, process 500 continues at block 504, as earlier described.

Eventually, it is determined at block 510 that the last row of the column (or last column of the row) has been reached. At such time, process 500 proceeds to block 512.

While the combining/stitching process to generate the composite aerial image has been described with an example process that starts at one of the 4 corners of a substantially rectangular sectional partition of the vineyard, it should be noted that the present disclosure is not so limited. The vineyard may be in any shape, and may be partitioned into sections in non-rectangular manner. The combining/stitching process may start with any aerial image, and radiates out to combine and stitch the next aerial image in any number of directions successively.

Referring now to FIG. 6, wherein an example process for machine analyzing the images, according to various embodiments, is illustrated. As shown, for the embodiments, example process for machine analyzing the images include operations at blocks 602-612. The operations at blocks 602-612 may be machine performed by e.g., analyzer 324 of FIG. 3.

Process 600 starts at block 602. At block 602, an individual aerial image (and optionally, corresponding terrestrial images of the section) is (are) retrieved. Next, at block 604, topological information of the vineyard and current planting information for the section are retrieved. From block 604, process 600 may proceed to one of blocks 606, 608 or 610 depends on whether corresponding terrestrial images are also analyzed, and/or whether local/remote environmental data are considered.

If corresponding terrestrial images are also analyzed, process 600 proceeds to block 606. At block 606, phenology information of the varietals being grown, at different stages, are retrieved for the analysis. If environmental data are also being taken into consideration, process 600 also proceeds to block 608. At block 608, the local/remote environmental data are retrieved.

From block 604, 606 or 608, process 600 eventually proceeds to block 610. At block 610, the aerial image, and optionally, corresponding terrestrial images, are analyzed for anomalies associated with growing vine of the various varietals. As described earlier, the analysis takes into consideration the topological information of the vineyard, and current planting information. The analysis may also optionally take into consideration phenology information, at different growing stages, and/or local/remote environmental data.

If anomalies are not detected, process 600 ends, otherwise the anomalies are noted, before ending process 600. Process 600 may be repeated for each section or selected sections of the vineyard.

Figure 7:
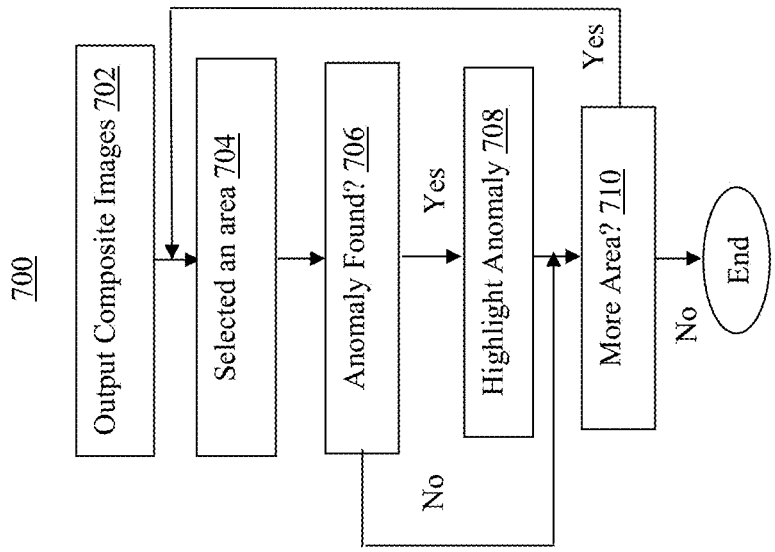
FIG. 7 illustrates an example process for machine generating the visual report to assist in managing growing vines of a number of varietals, according to various embodiments.

Referring now to FIG. 7, wherein an example process for machine generating a visual report, according to various embodiments, is illustrated. As shown, for the embodiments, processor 700 includes various operations performed at blocks 702-710. The operations at blocks 702-710 may be performed by e.g., reporter 326 of FIG. 3.

Example process 700 starts at block 702. At block 702, one or more composite aerial images are outputted. Next at block 704, an area of the vineyard, is selected, and at block 706, the selected area is examined to determine whether anomalies associated with growing vine of the varietals were detected. If a result of the determination indicates that anomalies associated with growing vine of the varietals were not detected, process 700 proceeds to block 710, else process 700 proceeds to block 708, before proceeding to block 710. At block 708, the visual report is annotated to highlight the anomaly detected.

At block 710, a determination is made on whether there are additional areas to be analyzed. If a result of the determination indicates there are additional areas to be analyzed, process 700 returns to block 704, and proceeds therefrom as earlier described. Otherwise, process 700 ends.

Figure 8:
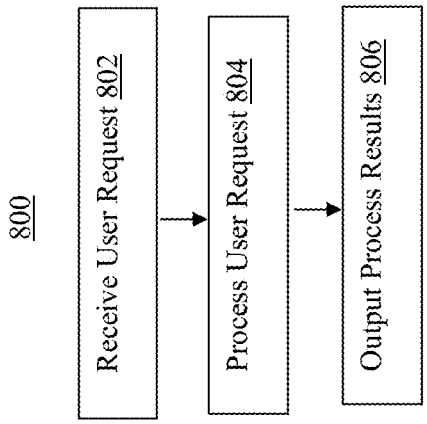
FIG. 8 illustrates an example process for machine facilitating interactive viewing of the visual report, according to various embodiments.

Referring now FIG. 8, wherein an example process for machine facilitating interactive viewing of a visual report, according to various embodiments, is illustrated. As shown, for the illustrated embodiments, process 800 for facilitating interactive viewing of the visual report comprises operations at blocks 802-806. In some embodiments, operations at blocks 802-806 may be performed by e.g., interactive report reader 328 of FIG. 3.

Process 800 may start at block 802. At block 802, a user request may be received. The user request may be associated with displaying a new visual report, providing further information on a detected anomaly, providing remedial action suggestions for a detected anomaly, and so forth. Next at block 804, the user request may be processed. At block 806, the processing results, e.g., the requested visual report, further explanation of an anomaly of interest, a remedial action suggestion, and so forth, may be outputted/displayed for the user. The process results may optionally further include facilities for further interaction by the user.

Figure 9:
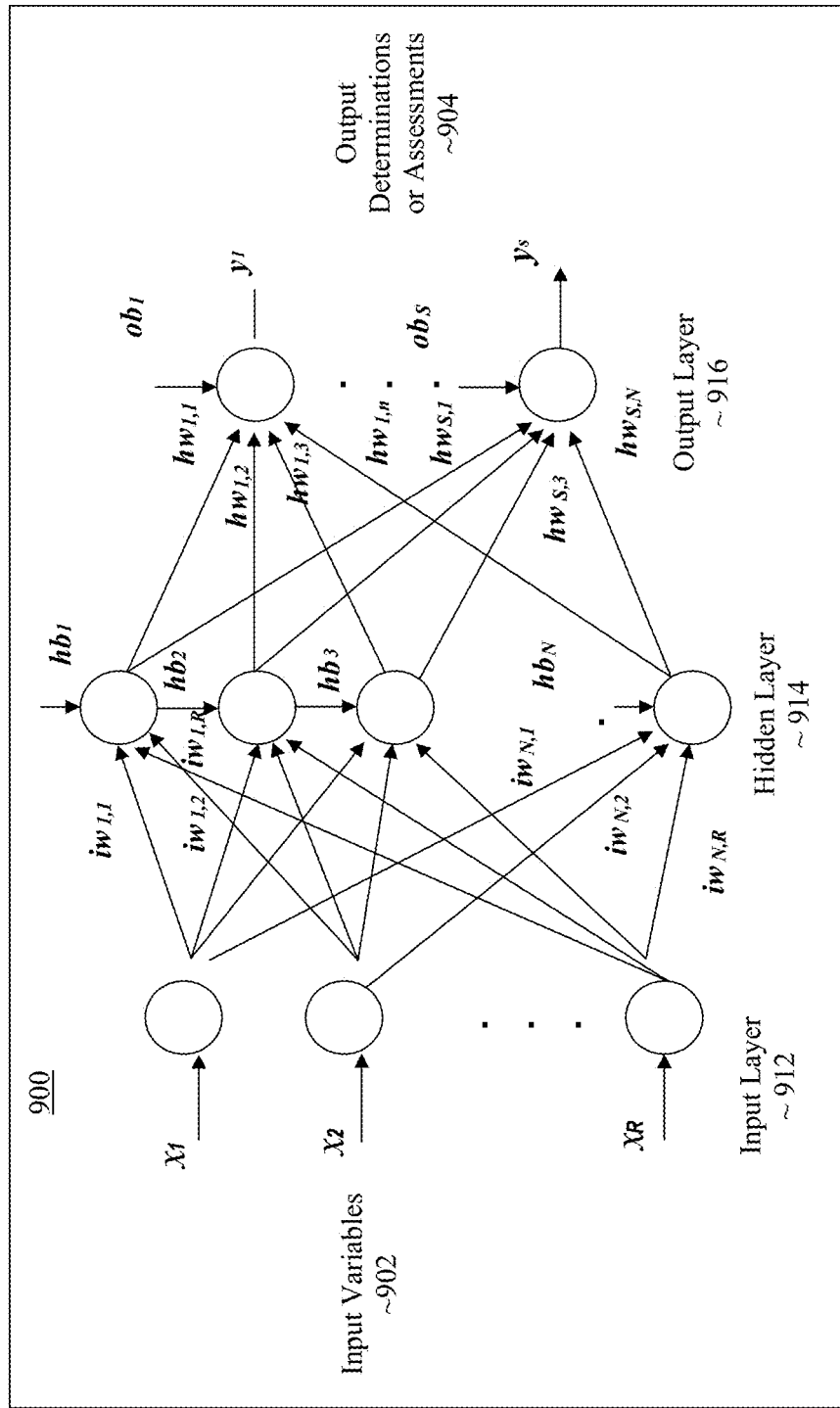
FIG. 9 illustrates an example neural network suitable for use with present disclosure to analyze aerial and/or terrestrial images for vine growing anomalies, according to various embodiments.

Referring now to FIG. 9, wherein an example neural network, in accordance with various embodiments, is illustrated. As shown, example neural network 900 may be suitable for use e.g., by analyzer 324 of FIG. 3, in determining whether the images suggest anomalies associated with growing vines of the varietals. Example neural network 900 is a multilayer feedforward neural network (FNN) comprising an input layer 912, one or more hidden layers 914 and an output layer 916. Input layer 912 receives data of input variables ($x_i$) 902. Hidden layer(s) 914 processes the inputs, and eventually, output layer 916 outputs the determinations or assessments ($y_i$) 904. In one example implementation the input variables ($x_i$) 902 of the neural network are set as a vector containing the relevant variable data, while the output determination or assessment ($y_i$) 904 of the neural network are also as a vector.

Multilayer feedforward neural network (FNN) may be expressed through the following equations:

$$ho_i = f(\Sigma_{j=1}^{R}(iw_{i,j}x_j) + hb_i), \text{ for } i=1,\ldots,N$$

$$y_i = f(\Sigma_{k=1}^{N}(hw_{i,k}ho_k) + ob_i), \text{ for } i=1,\ldots,S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of pth output unit for sample k, respectively, and m is the number of samples.

In some embodiments, analyzer 324 of FIG. 3 may include a pre-trained neural network 900 to determine whether an aerial and/or a terrestrial image suggests one or more anomalies associated with growing vines of the varietals. The input variables ($x_i$) 902 may include an aerial image of a section captured in a particular spectrum, one or more corresponding terrestrial images, topological data, current planting data, phenology data, and environmental data. The output variables ($y_i$) 904 may include values indicating whether anomalies are detected and/or anomaly types. The network variables of the hidden layer(s) for the neural network of analyzer 324 for determining whether an aerial image of a section captured in a particular spectrum and/or corresponding terrestrial images suggest anomalies with the vines being grown, are determined by the training data.

In the example neural network of FIG. 9, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 10:
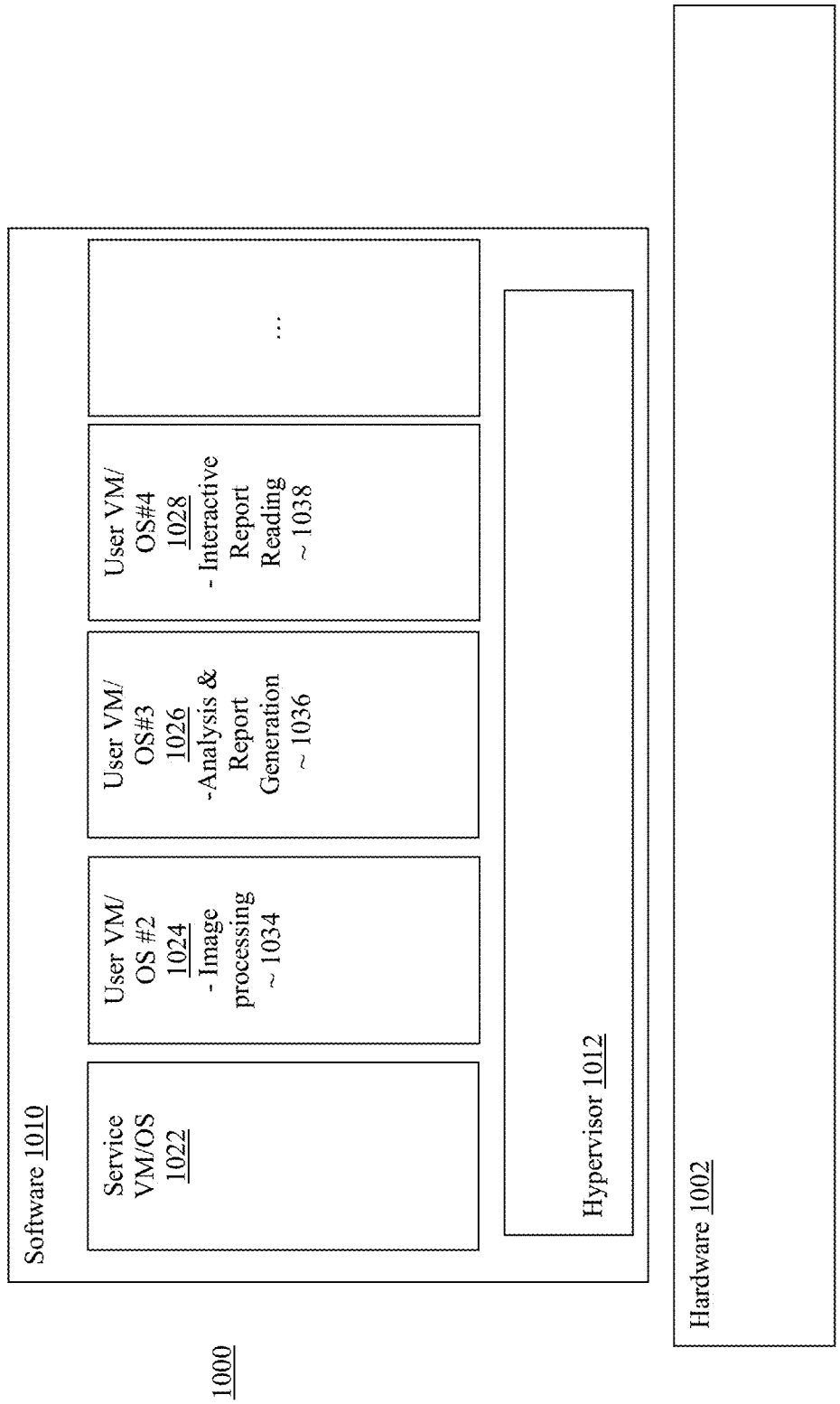
FIG. 10 illustrates an example software component view of the vine growing management system of FIG. 1, according to various embodiments.

Referring now to FIG. 10, wherein a software component view of the vine growing management (VGM) system, according to various embodiments, is illustrated. As shown, for the embodiments, VGM system 1000, which could be VGM system 110, includes hardware 1002 and software 1010. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service machine 1022 includes a service OS hosting execution of a number of system services and utilities. User VMs 1024-1028 may include a first user VM 1024 having a first user OS hosting execution of image processing 1034, a second user VM 1026 having a second user OS hosting execution of analysis and report generation 1036, and a third user VM 1028 having a third user OS hosting execution of interactive report viewing, and so forth.

Except for the vine growing management technology of the present disclosure incorporated, elements 1012-1038 of software 1010 may be any one of a number of these elements known in the art. For example, hypervisor 1012 may be any one of a number of hypervisors known in the art, such as KVM, an open source hypervisor, Xen, available from Citrix Inc, of Fort Lauderdale, Fla., or VMware, available from VMware Inc of Palo Alto, Calif., and so forth. Similarly, service OS of service VM 1022 and user OS of user VMs 1024-1028 may be any one of a number of OS known in the art, such as Linux, available e.g., from Red Hat Enterprise of Raliegh, N.C., or Android, available from Google of Mountain View, Calif.

In alternate embodiments, where VGM 1000 may be configured to service multiple vineyards, each user VM 1024, 1026 and 1028 may be configured to respectively handle image processing, analysis, report generation, and interactive report viewing of one vineyard, to provide data isolation between vineyards.

Figure 11:
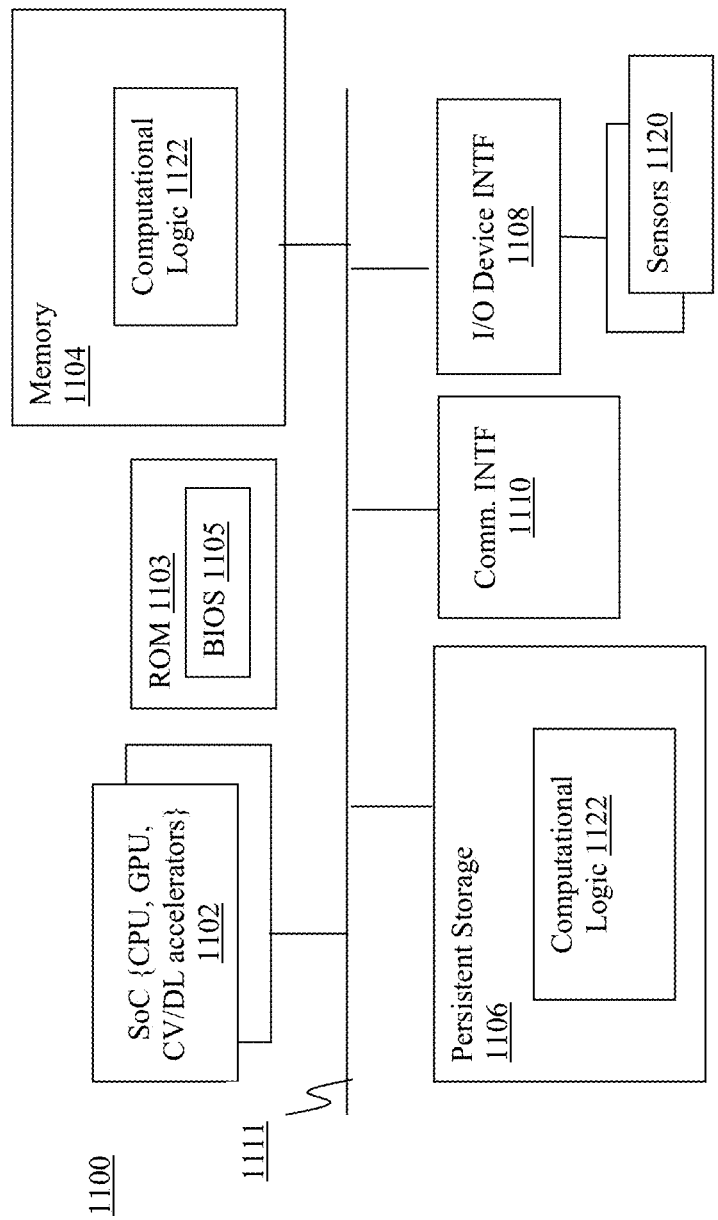
FIG. 11 illustrates an example hardware component view of the hardware platform for the vine growing management system of FIG. 1, according to various embodiments.

Referring now to FIG. 11, wherein an example computing platform that may be suitable for use to practice the present disclosure, according to various embodiments, is illustrated. As shown, computing platform 1100, which may be hardware 1002 of FIG. 10, may include one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include input/output (I/O) device interface to couple I/O devices 1108 (such as display, keyboard, cursor control and so forth) to system 1100, and communication interfaces 1110 (such as network interface cards, modems and so forth). Communication and I/O devices 1108 may include any number of communication and I/O devices known in the art. I/O devices may include in particular sensors 1120, which may be some of the sensors 108 of FIG. 1. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1112, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 112, service/user OS of service/user VM 1022-1028, and components of the VGM technology (such as image processor 322, analyzer 324, reporter 326 and interactive report reader 328, and so forth), collectively referred to as computational logic 922. The various elements may be implemented by assembler instructions supported by processor core(s) of SoCs 1102 or high-level languages, such as, for example, C, that can be compiled into such instructions.

Figure 12:
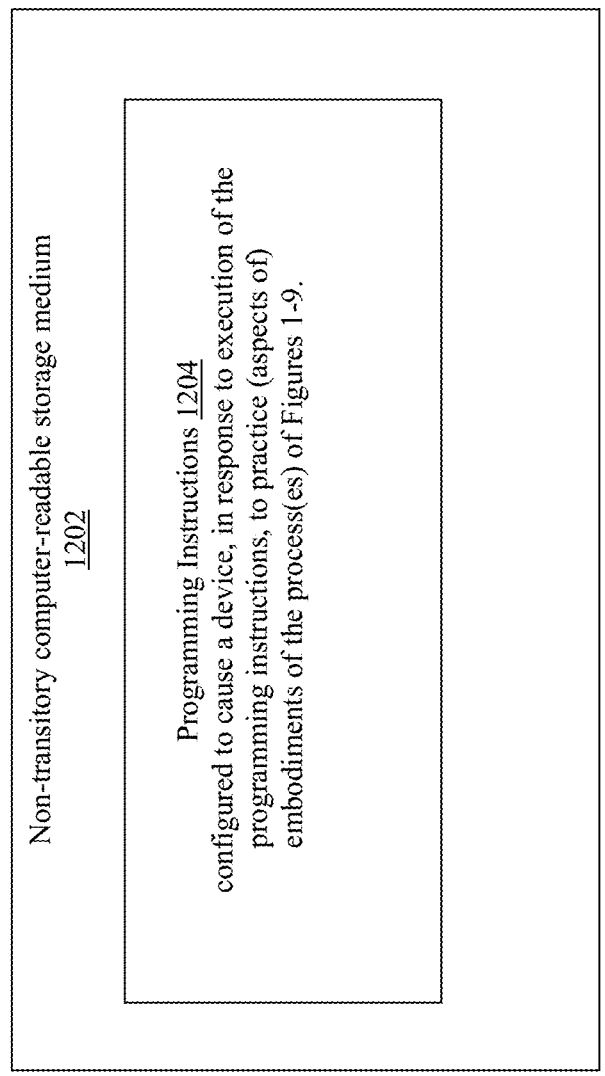
FIG. 12 illustrates a storage medium having instructions for practicing methods described with references to FIGS. 1-9, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 112, service/user OS of service/user VM 122-128, and components of VGM technology (such as mage processor 322, analyzer 324, reporter 326 and interactive report reader 328, and so forth) In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for managing growing vines in a vineyard, comprising:

operating one or more unmanned aerial vehicles (UAVs) to fly over a plurality of sections of the vineyard, the one or more unmanned UAVs together being fitted with a plurality of cameras equipped to generate images in a plurality of spectrums, wherein the plurality of sections of the vineyard grow vines of a plurality of varietals, and the plurality of cameras include a Red-Green-Blue (RGB) camera equipped to generate images in a visual spectrum, a Normalized Difference Vegetation Index (NDVI) camera equipped to generate images in red or near infrared spectrum, and a Normalized Difference Red Edge (NDRE) camera equipped to generate images in near red spectrum;

taking a plurality of aerial images of the sections of the vineyard in the plurality of spectrums, using the plurality of cameras, while the one or more UAVs are flying over the plurality of sections of the vineyard;

storing the plurality of images in a computer readable storage medium (CRSM);

executing an analyzer on a computing system with access to the CRSM to machine analyze the plurality of aerial images in the visual, red or near infrared, and near red spectrums, and a plurality of terrestrial images for anomalies associated with growing the vines of the plurality of varietals in the plurality of sections of the vineyard, including potential pest infestations, the machine analysis taking into consideration topological information of the vineyard, as well as current planting information of the vineyard; and executing a reporter on the computing system to machine produce a visual report with indications of vine growing anomalies in the plurality of sections of the vineyard, including potential pest infestations, to assist in managing growing the vines of the plurality of varietals in the plurality of sections of the vineyard, the indication of vine growing anomalies, including potential pest infestations, being based at least in part on results of the analysis of the visual, red or near infrared, and near red spectrum images, and the terrestrial images.

2. The method of claim 1, wherein operating the one or more UAVs to fly over the plurality of sections of the vineyard comprises operating one or more UAVs to systematically fly over all sections of the vineyard.

3. The method of claim 1, wherein operating the one or more UAVs to fly over the plurality of sections of the vineyard comprises operating UAV having the RGB, NDVI and NDRE cameras to generate the visual, red or near infrared, and near red spectrum images.

4. The method of claim 1, wherein the vineyard spans over 100 acres, with over 1000 vines planted per acre, and each pixel of each of the plurality of aerial images covers about 3-4 $cm^2$ or smaller.

5. The method of claim 1, wherein to machine analyze the plurality of aerial images comprises to machine identify one or more of the sections as potentially in an over irrigated state or an under irrigated state for the varietals being grown in the one or more sections, based at least in part on the topological information of the vineyard, as well as the current planting information of the vineyard.

6. The method of claim 5, wherein executing the reporter on the computer system comprises executing the reporter on the computer system to machine produce the visual report with indications of the one or more sections identified as potentially in an over irrigated state or an under irrigated state for the varietals being grown in the one or more sections.

7. The method of claim 1, further comprising executing an image processing program on the computing system to machine process the plurality of aerial images to combine the plurality of aerial images to produce one or more composite images of the vineyard; wherein the reporter machine produces the visual report using the one or more composite images of the vineyard.

8. The method of claim 1, further comprising:

operating one or more terrestrial robots to traverse the plurality of sections of the vineyard, the one or more terrestrial robots being fitted with one or more cameras equipped to generate the plurality of terrestrial images in the visual spectrum; and taking the plurality of visual spectrum terrestrial images of the vines of the plurality of varietals being grown in the plurality of sections of the vineyards, using the one or more cameras fitted on the one or more terrestrial robots, while the one or more terrestrial robots are traversing the plurality of sections of the vineyard.

9. The method of claim 8, further comprising storing the plurality of visual spectrum terrestrial images of the vines of the plurality of varietals being grown, in the CRSM; and wherein executing the analyzer further comprises executing the analyzer on the computing system to machine analyze the plurality of visual spectrum terrestrial images, with the machine analysis of the visual spectrum terrestrial images taking into consideration phenology information of the varietals being grown, at different growing stages.

10. The method of claim 9, wherein to machine analyze the plurality of visual spectrum terrestrial images for additional anomalies comprises to machine identify potential pest infestation in one or more vines of one or more varietals being grown in the one or more of the sections of the vineyard, based at least in part on the phenology information of the varietals being grown, at different growing stages.

11. The method of claim 10, wherein executing the reporter on the computer system comprises executing the reporter on the computer system to machine produce the visual report with indications of the one or more vines of one or more varietals being grown in the one or more of the sections of the vineyard as being potentially pest infested.

12. The method of claim 1, further comprising sensing with a plurality of sensors disposed in at least selected ones of the plurality of sections of the vineyard environmental data at various locations in the selected ones of the sections of the vineyard; and wherein machine processing and analyzing of the plurality of aerial and terrestrial images is further in view of the environmental data sensed at the various locations in the selected ones of the sections of the vineyard.

13. The method of claim 1, further comprising receiving, from an external source, environmental data applicable to the vineyard; and wherein machine processing and analyzing of the plurality of aerial and terrestrial images is further in view of the environmental data applicable to the vineyard.

14. The method of claim 1, further comprising executing an interactive report reader on the computer system to facilitate a user in viewing the visual report interactively.

15. A method for managing growing vines in a vineyard, comprising:

operating one or more terrestrial robots to traverse a plurality of sections of the vineyard, the one or more terrestrial robots being fitted with one or more cameras equipped to generate images in visual spectrum, and the plurality of sections of the vineyard growing vines of a plurality of varietals;

taking a plurality of visual spectrum terrestrial images of the vines of the plurality of varietals growing in the sections of the vineyard, using one or more cameras, while the one or more terrestrial robots are traversing the plurality of sections of the vineyard;

storing the plurality of visual spectrum terrestrial images in a computer readable storage medium (CRSM);

executing an analyzer on a computing system with access to the CRSM to machine analyze the plurality of visual spectrum terrestrial images and a plurality of aerial images for anomalies associated with growing the vines of the plurality of varietals in the plurality of sections of the vineyard, where the plurality of aerial images include visual, red or near infrared, and near red images respectively taken by a Red-Green-Blue (RGB) camera, a Normalized Difference Vegetation Index (NDVI) camera, and a Normalized Difference Red Edge (NDRE) camera, the anomalies including pest infestation among the vines, and the machine analysis taking into consideration current planting information of the vineyard and phenology information of the vines of the plurality of varietal being grown in the plurality of sections of the vineyard, at different growing stages; and executing a reporter on the computer system to machine produce a visual report with indications of growing anomalies of the vines to assist in managing growing the vines of the plurality of varietals in the plurality of sections of the vineyard, the indication of growing anomalies being based at least in part on results of the analysis.

16. The method of claim 15, wherein executing the analyzer comprises executing the analyzer on the computing system to process and analyze the plurality of visual spectrum terrestrial images in view of the current planting information of the vineyard and the phenology information of the vines of the plurality of varietals being grown at different growing stages, to identify one or more vines being grown in one or more of the sections as potentially being infested.

17. The method of claim 16, wherein executing the reporter comprises executing the reporter on the computing system to machine produce the visual report with highlights of the identified potential pest infestations.

18. At least one non-transitory computer readable medium (CRM) having instructions stored therein to cause a computing system, in response to execution of the instructions by the computing system, to:

analyze a plurality of aerial images in a plurality of spectrums and a plurality of terrestrial images for anomalies associated with growing vines of a plurality of varietals in a plurality of sections of a vineyard, taking into consideration topological information of the vineyard, as well as current planting information of the vineyard, the plurality of aerial images include visual, red or near infrared, and near red images respectively taken by an airborne Red-Green-Blue (RGB) camera, an airborne Normalized Difference Vegetation Index (NDVI) camera, and an airborne Normalized Difference Red Edge (NDRE) camera, the plurality of terrestrial images being captured by one or more roving cameras, and the anomalies being analyzed include pest infestations; and produce a visual report with indications of vine growing anomalies in the plurality of sections of the vineyard to assist in managing growing vine in the vineyard, the indication of vine growing anomalies, including pest infestations, being based at least in part on results of the analysis;

wherein the plurality of aerial images of the sections of the vineyard in the plurality of spectrums are taken using the RGB, NDVI and NDRE cameras fitted on one or more unmanned aerial vehicles (UAVs), while the one or more UAVs are flying over the plurality of sections of the vineyard.

19. The CRM of claim 18, wherein to analyze the plurality of aerial images comprises to identify one or more of the sections as potentially in an over irrigated state or an under irrigated state for the varietals being grown in the one or more sections, based at least in part on the topological information of the vineyard, as well as the current planting information of the vineyard.

20. The CRM of claim 19, wherein to produce the visual report comprises to produce the visual report with indications of the one or more sections identified as potentially in the over irrigated state or the under irrigated state for the varietals being grown in the one or more sections.

21. The CRM of claim 18, wherein the analysis of the visual spectrum terrestrial images takes into consideration phenology information of the varietals being grown, at different growing stages.

22. The CRM of claim 21, wherein to identify potential pest infestations is based at least in part on the phenology information of the varietals being grown, at different growing stages.

23. The CRM of claim 22, wherein to produce the visual report comprises to produce the visual report with indications of one or more vines of one or more varietals being grown in the one or more of the sections of the vineyard as being potentially pest infested.

* * * * *